Aug. 5, 1930. C. PEARSON 1,772,264
MOWER
Filed Sept. 13, 1926 3 Sheets-Sheet 1

Inventor:
Charles Pearson
By H.P. Dalecke
Atty

Aug. 5, 1930.   C. PEARSON   1,772,264
MOWER
Filed Sept. 13, 1926   3 Sheets-Sheet 2

Inventor:
Charles Pearson

Aug. 5, 1930.  C. PEARSON  1,772,264
MOWER
Filed Sept. 13, 1926  3 Sheets-Sheet 3
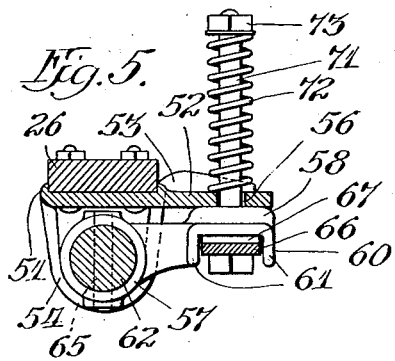
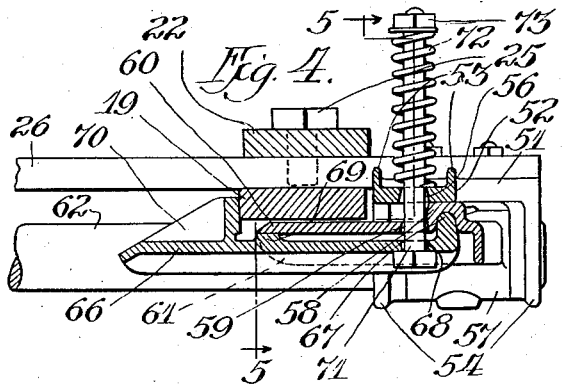
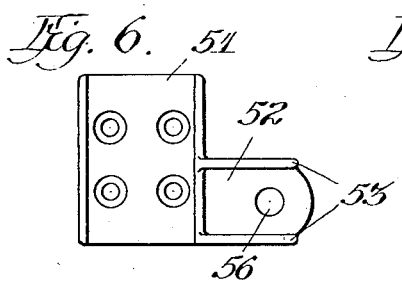
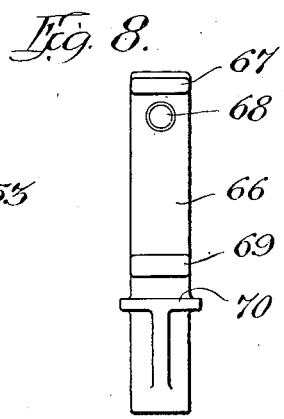
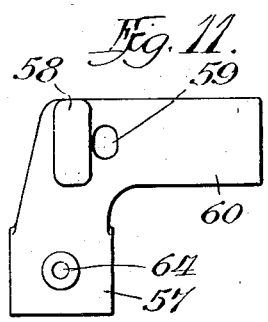
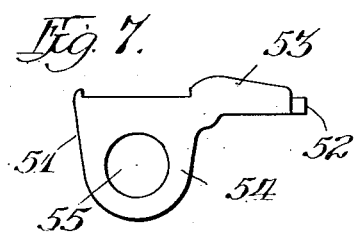
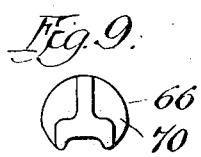
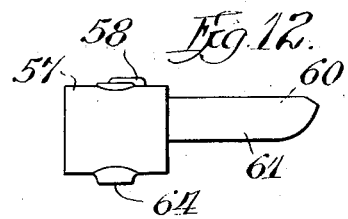
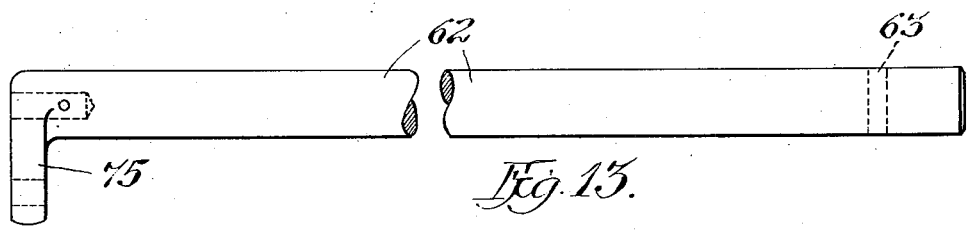
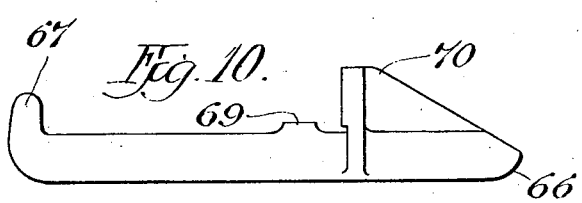
Inventor:
Charles Pearson,
By H. P. Doolittle
Atty Patented Aug. 5, 1930

1,772,264

UNITED STATES PATENT OFFICE

CHARLES PEARSON, OF CHICAGO, ILLINOIS, ASSIGNOR TO INTERNATIONAL HARVESTER COMPANY, A CORPORATION OF NEW JERSEY

MOWER

Application filed September 13, 1926. Serial No. 134,965.

This invention generally relates to mowing machines.

At the present time the trend in modern farming operations is to rely more and more upon tractors for draft purposes, as well as for power operation of attached implements. This trend is especially pronounced in the present day operation of mowers. Because of the relatively greater power of tractors as compared with draft animals, it is not surprising that the mowing operation has been speeded up considerably. This relatively fast passage of the mower through the field is, of course, highly desirable, but this advantage has often been minimized due to the difficulty encountered because of obstructions, such as rocks and stumps in the field, which the laterally extending cutter bar of the mower would strike with the ever present danger of its demolition under such conditions.

With this general statement in mind, this invention more specifically considered, relates to a mower attachment for tractors in which the advantage of speed will be retained by providing mower structure which will overcome completely the danger of breakage when encountering an obstruction in the field.

The primary object of this invention is to provide a mower, and particularly a mower attachment for a tractor, the laterally extending cutter bar of which is carried on a mower frame pivotally connected to another or rigid frame such as the drawbar of the tractor, the pivoted mower frame being locked by a latch to the rigid frame or drawbar during normal operation, which latch however is automatically uncoupled when the cutter bar strikes an obstruction, whereby the mower attachment with its pivoted frame may swing back to prevent injury.

Another object is to provide a mower attachment of the kind specified in which the mower is driven from a tractor power take-off shaft, said shaft when the mower frame is pivoted backwardly to a predetermined angle, being automatically uncoupled to disconnect the mower from the tractor transmission so that the mower cannot be driven in this unlatched position.

Still another object is to provide a simple and efficient mower attachment for a tractor to be power driven therefrom and which may be easily and quickly attached and detached from the tractor.

Other objects will be apparent to those skilled in this art as the description of this improved mower proceeds.

Briefly, these very desirable objects are accomplished in the provision of a mower which has a frame and a laterally extending cutter bar, said frame being connected to the bar by a coupling arm, the mower frame being pivotally mounted on a rigid frame or support such as the drawbar of a tractor. Furthermore this mower frame is normally latched by a releasable member to the rigid frame or tractor drawbar, the same being so constructed that, when the cutter bar strikes an immovable obstruction, the cutter bar will, through the forces created by its resistance to the obstruction, act on the coupling arm, which will operate mechanism to release the pivoted mower frame from the rigid or drawbar frame, whereupon the mower attachment will bodily swing backwardly about its pivot. The cutting mechanism of the mower is power driven from the tractor transmission by means of a power take-off shaft, and as the mower, after its release from the drawbar, swings back, the driving connection also is automatically uncoupled, thereby preventing injury to the cutting mechanism. The mower is automatically returned to its normal position latched to the drawbar by backing the tractor toward the mower attachment. The tractor, of course, is immediately stopped after the bar has encountered an obstruction. The driving connections are splined so that it is an easy matter to connect up the drive again.

Reference should now be made to the accompanying sheets of drawings, in which:—

Figure 4 is a detail sectional view through the releasable latch as seen along the line 4—4 in Figure 1;

Figure 5 is a detail sectional view of the same construction as seen along the line 5—5 in Figure 4;

Figures 6 and 7, respectively, are plan and side views of the casting which connects the rockshaft to the latch;

Figures 8, 9 and 10, are, respectively, detail plan, front end, and side views of the latch;

Figures 11 and 12 are, respectively, plan and side views of the casting which limits the movement of the latch in one direction and supports the rock shaft; and Figure 13 is a detail side view of the rock shaft which functions to release the latch.

Figure 1:
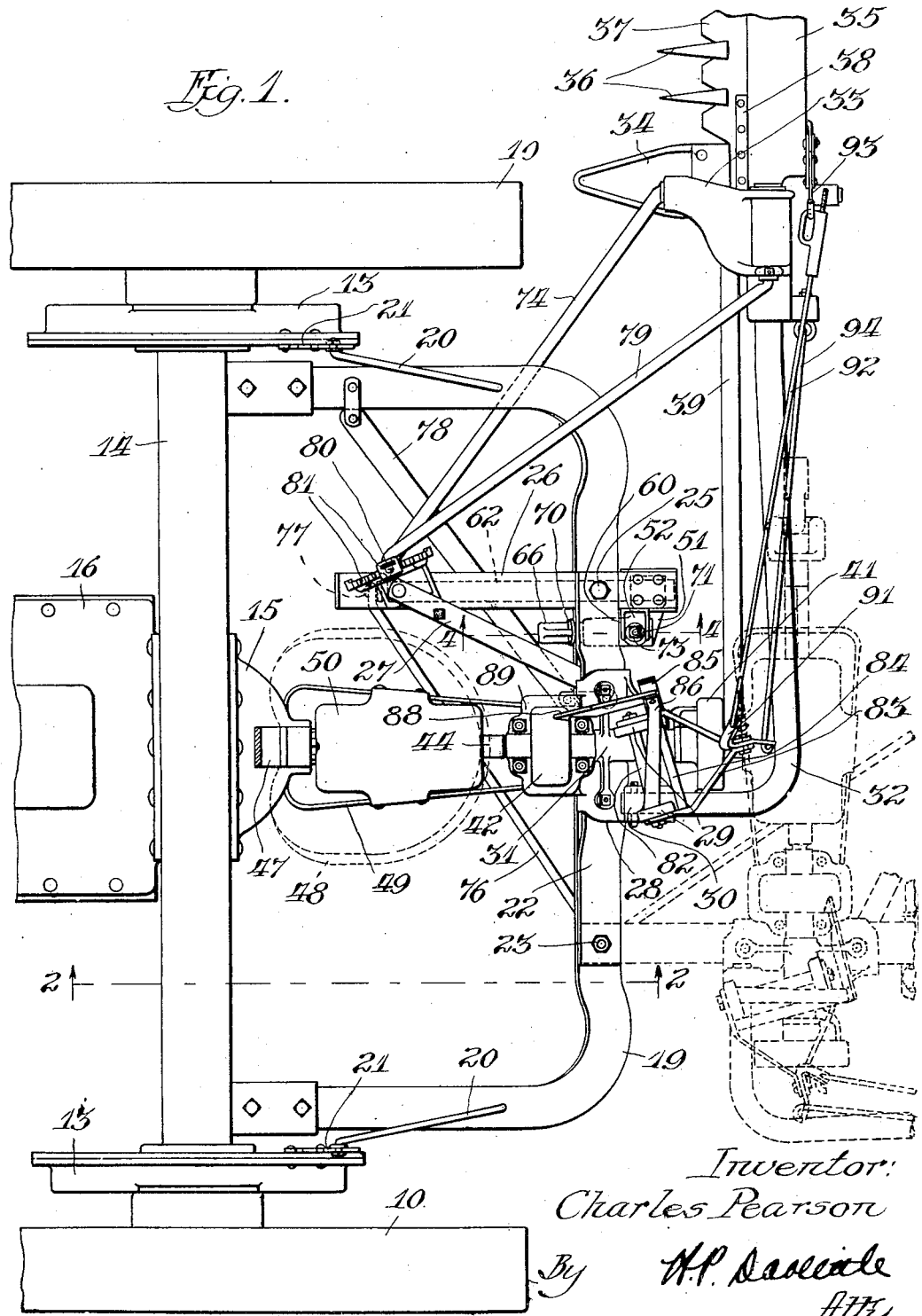
Figure 1 is a plan view showing the improved mower construction mounted on the drawbar of a tractor with the rear end of the tractor only being shown.
Figure 2:
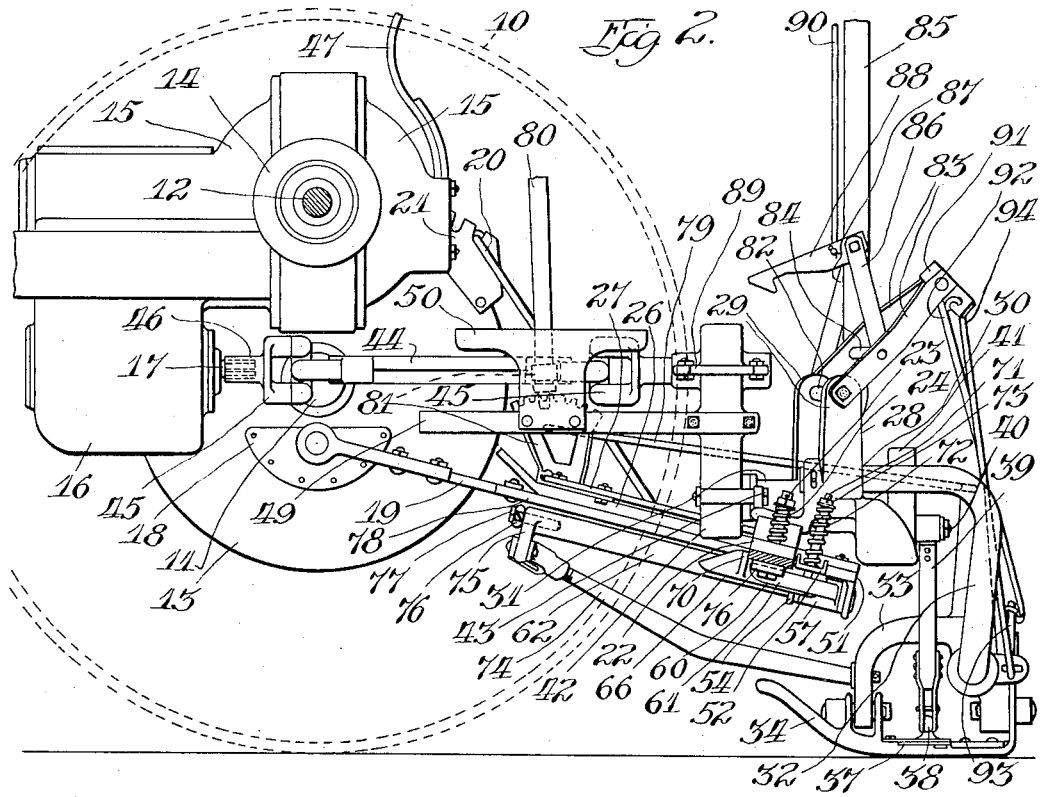
Figure 2 is a side elevational view of the same construction shown in Figure 1 as viewed along the line 2—2 of Figure 1.

Inspection of Figures 1 and 2 shows that the illustrative embodiment of this improved mower has been shown in connection with a tractor having rear wheels 10, stub axles 11, only one of which is shown, a differential drive shaft 12, and gear casings 13, which house gearing for connecting the shaft 12 to drive the stub axles 11 and the wheels 10. The shaft 12 is encased in a housing 14 to which is bolted centrally the differential housing 15 in which are journaled the gears which drive the said shaft. Forwardly of the housing 14 is a transmission housing 16 from which protrudes rearwardly a power take-off shaft 17. Each of the casings 13 carries a gudgeon plate 18 from which is pivotally hung the legs of a U-shaped draft bar or element 19 which extends rearwardly of the tractor and is additionally supported by means of links 20 adjustably connected in notched plates 21 bolted to the top of the casings 13. So much of the tractor description will suffice for the purpose of this disclosure.

Figure 3:
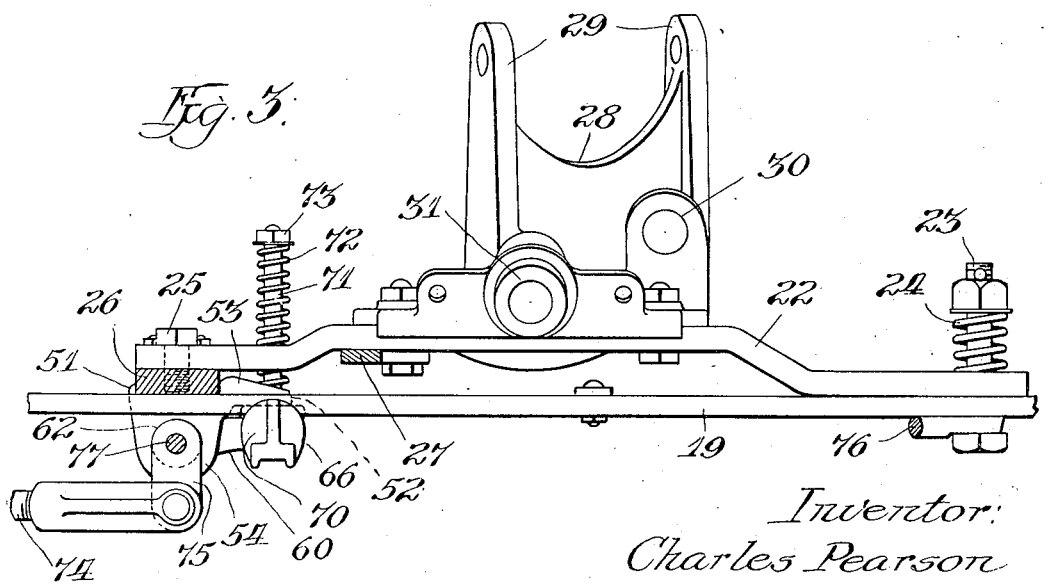
Figure 3 is a detail view of the releasable latch mechanism, and it also shows the mower frame mounting on the tractor drawbar as seen when looking from the front toward the rear of the tractor.

This draft bar or element 19 forms the support which carries and connects the improved mower now to be described to the tractor. The bight portion of the U-bar 19 has pivotally connected thereto a slightly arched bar 22 (see Figure 3) which is yieldingly pivoted to the bar 19 adjacent its left-hand side by means of the bolt 23, which is encircled by a spring 24 functioning to bear down yieldingly on the bar 22. This arched bar 22 which extends transversely, as can be seen, has bolted thereto at its right-hand end, by means of a bolt 25, a longitudinally extending bar or plate 26 which has its front end angularly upturned as shown in Figures 1 and 2. As shown in Figures 3 and 4, it will be seen that this bolt 25 is relatively short and does not pass into the draft bar 19. These bars 22 and 26 in effect constitute the mower main frame, and it will be seen that the left-hand end of the frame is pivotally connected to the draft bar 19 while the right-hand end loosely rests on this draft bar.

These frame parts 22 and 26 are cross braced by a bar 27, as shown in Figures 1 and 3. Bolted on the arched plate 22, as shown in these figures, is a vertically disposed, integral casting 28 which has two upstanding arms 29 formed thereon, and a socket 30 and another socket 31 formed therein. In the socket 30 there is rockably mounted a rearwardly and laterally extending coupling bar 32 which rockably carries at a point substantially rearwardly of the right end tractor wheel 10 a mower coupling yoke 33 which pivotally carries a conventional mower shoe 34, and to which in turn is connected a mower cutter bar 35 to which are attached the usual guard fingers 36 between which operates the conventional cutting mechanism 37.

The cutting mechanism carries a pitman head 38. This pitman head 38 has connected thereto a pitman 39, the left-hand end of which is operatively connected to a wrist pin 40 eccentrically carried on a fly wheel 41. The fly wheel 41 is carried at the rear end of a transversely disposed shaft, not shown, which passes through the socket 31 in the member 28, the shaft then extending forwardly and into the lower end of a casing 42 which is bolted to the front end of the member 28 by the bolts 43. This casing 42 encloses cut gears which are driven from a flexible shaft 44 disposed in line horizontally with the power take-off shaft 17 protruding rearwardly from the tractor transmission. The shaft 44 is made flexible by the interposition therein of the universal knuckles 45 shown, the forward one of which has a telescoping splined connection 46 to the shaft 17 on the tractor. The housing 42 is dust proof and contains a lubricant so that the gears therein may run in oil, and this oil likewise is distributed in practice to lubricate the shaft which carries the fly wheel 14 as well as the wrist pin 40. It can now be seen that the cutting mechanism of the mower will be reciprocated by the pitman 39 connected to the fly wheel 41 which receives its rotation through the connections described from the power take-off shaft 17 of the tractor. At 47 is indicated the support on the tractor for carrying the operator's seat 48, and, in view of the fact that this seat is disposed directly above the driving connections from the tractor to the mower, it is advisable that a shield be provided to prevent injury to the operator from the rapidly rotating shaft 44. Accordingly the casing 42 has bolted thereto on opposite sides a U-shaped member 49 which carries a shield or hood 50 for safety purposes.

As heretofore stated, the main object of this invention was to provide a mower frame releasably attached to a support, such as the tractor drawbar, whereby, when the mower cutter bar encounters an immovable obstruction, or when the resistance on the cutter bar becomes too great, it will be automatically detached from said support, to permit the mower frame to pivot back rearwardly ot the tractor to prevent breakage of the mower. This structure will now be described.

The rear end of the plate 26 which extends slightly back of the draft bar 19, has bolted in a position on its under side a casting 51 (see Figures 1, 4, 5, 6 and 7) which is formed with a stubblewardly extending arm portion 52 provided with vertical, spaced strengthening flanges 53. The main part of this casting is formed with two downward, spaced ears 54 which are provided with alined, horizontal openings 55, as shown. The arm 52 is provided with a vertical opening 56.

Another casting shown in detail in Figures 11 and 12 is provided, which has a barrel portion 57 fitted between the ears 54 of the casting 51, as shown in Figures 4 and 5. This second casting is formed with a hump 58 abutting the under side of the arm 52, and a hole 59 disposed in vertical alinement with the hole 56. Extending right angularly of the extended barrel 57, the casting is formed with an arm 60 provided along its sides with depending flanges 61, which portion 60 extends longitudinally forwardly beneath the draft bar 19.

Passed through the barrel portion 57 is the rear end of a rockshaft 62 which holds the barreled casting between the ears 54 of the casting 51 by being passed through said barrel and through the holes 55 of the casting 51. The shaft 62 lies underneath the plate 26 and extends substantially the length thereof. The rear end of the shaft 62 (see Figure 13) is provided with a hole 63 and the barreled casting with a hole 64, the two holes being alined to receive a pin 65 for securing the said casting on said shaft.

A third casting (see Figures 4, 5, 8, 9 and 10) formed as a latch 66 is provided, the casting having a tail 67 loosely engaged in the hump 58 underneath the arm 60 of the second casting. The latch is also formed with a hole 68 placed in vertical alinement with the holes in the other castings, as seen in Figure 4. The latch additionally has a boss 69 and inclined latch portion 70 formed thereon. An upstanding headed bolt 71 and an encircling spring 72, whose tension may be adjusted by a nut 73, yieldingly holds all of the castings together. The spring 72 constantly exerts a force to hold the latch part 70 engaged with the drawbar 19, as shown in Figure 4.

The front end of the yoke 33 of the mower is connected by a coupling arm 74 to the front end of the rockshaft 62 by means of an integral crank portion 75 formed on said shaft. A diagonal brace rod 76 is pivoted to the drawbar by the bolt 23 and to the front end of the shaft 62, axially, by a pin 77, as shown. The right hand corner of the draft bar 19 is provided with a connecting plate 78 for a purpose later to appear.

The cutter bar may be tilted by rocking the yoke 33 through the medium of a rod 79 connected to the yoke and to a lever 80 associated with a conventional rack and detent 81 mounted on the front end of the plate 26.

It can now be seen that when the cutter bar strikes an immovable obstruction a pull will be exerted on the coupling arm 74 to rock the shaft 62, which will cause the latch 66 and its part 70 to be disengaged from the drawbar 19, whereupon the entire mower frame with the cutter bar will swing angularly, rearwardly, in a horizontal plane, about the pivot point 23, as shown in the dotted line position of the mower in Figure 1.

Of course, means has been provided for raising the cutter bar upwardly from its normal cutting position so that relatively slight obstructions may be passed without releasing the latch mechanism. This lift mechanism will now be described.

It will be remembered that the casting 28 is formed with two upstanding arms 29. These arms rockably carry a pin or shaft 82 (see Figures 1, 2 and 3) on which is mounted an arch 83, the arch in turn carrying a rigid pin 84 on which is carried a long lever 85 within reach of an operator on the seat 48. A brace 86 connects said lever with the pin 84 and a second brace 87 connects the lever with the pin 82. The lever carries a pivoted hook 88 which may engage over a flange 89 formed on the gear casing 42. The hook may be controlled by any suitable form of detent link 90. When the hook 88 is latched on the gear housing the cutter bar is adjusted vertically to intermediate lift position, which is useful when passing over slight obstructions.

The arch at its upper end carries a bent piece 91 one end of which is connected by a link 92 to a pull link 93 attached to the cutter bar and the other end of the piece 91 is connected by a link 94 to the coupling yoke 33 at its back side.

Thus, it can be seen that slight forward movement of the lever will give a plain lift of the cutter bar sufficient to permit the bar to pass slight obstructions. For absolute vertical lift the lever 85 will be first moved forwardly until the hook 88 locks over the flange 89 on the gear casing. The link 92 is then disconnected from the pull link 93 so that the link 94 must support the cutter bar alone in this intermediate position. The operator then lifts the cutter bar manually to vertical position and passes the link 92 through a hole in the cutter bar (not shown) intermediately of its length, where the link will be fastened in any suitable manner to provide a support for retaining the bar in absolute vertical position as when it is desired to transport the mower.

The operation of the mower can now be described. First we have the support for the mower, which in the present case is the tractor and particularly the draft element 19. At its left end this draft bar pivotally carries the mower frame which comprises, in the main, the plate 22 coincident with and on the draft bar, and the forwardly extending plate 26. This mower frame carries all of the lever adjusting mechanisms for tilting and vertically adjusting the cutter bar.

The cutter bar is connected to the pivoted mower frame in a manner to extend laterally of the rear end of the tractor. The coupling arm 74 of the mower is connected to the front end of the rockshaft, so that the shaft will be rocked when a force sufficiently great acts on the cutter bar, such as would be exerted when the cutter bar runs into a tree or stump. Rocking of the shaft 62 will swing the barreled casting on the rear end of the shaft, the extended arm of this casting acting like a crank to push down on the tail 67 and boss 69 of the latch 66 against the predetermined resistance of the spring 72 surrounding the bolt 71, which bolt passes through the castings at this point loosely to give the requisite play. Thus, the arm 60 of the barreled casting disengages the latch part 70 from the draft bar 19, with the result that the entire mower frame and cutter bar will pivot back angularly in a horizontal plane, as clearly indicated in the dotted line position of Figure 1. This movement in no way interferes with the lever adjustments, as all of this adjusting mechanism is mounted on the mower frame and swings with it.

As for the driving mechanism, when the mower frame has been released, the universal knuckles 45 permit of a slight angular displacement of said frame before the splined part 46 will disengage the take-off shaft 17. If the angular displacement of the frame is greater than the knuckles will allow, then the drive will be disconnected and operation of the cutting mechanism will cease. By this time the driver of the tractor has stopped the tractor and injury to the mower has been effectually prevented.

It will be remembered that the spring 72 constantly exerts a force to pull the latch 66 up. When unlatched from the draft bar 19 this upward tendency of the latch is restrained by the arm 60 of the barreled casting. This is important, for it makes automatic connection of the mower frame to the support after it has been uncoupled practicable and possible. This is accomplished by backing the tractor angularly toward the uncoupled mower frame, with the result that the latch is held in a position easily to engage the draft bar 19. The inclined portion on the part 70 of the latch rides under the draft bar or support, and the spring 72 forces it to hook onto the draft bar with the mower again in position for cutting. Also the front upturned end of the frame plate 26 assists in guiding the frame back onto the draft bar as will be understood. The splined part 46, of course, must be connected manually to the take-off shaft 17 before the cutting mechanism can again be operated, but this is a simple matter, taking but a moment, as will be obvious. The plate 78 helps support the front end of the rockshaft 62 and aids return of the mower frame after it has been displaced. This plate thus performs a guiding function.

With this detailed description, it can now be seen that all of the desirable objects heretofore mentioned are achieved, and that the structure for accomplishing these objects is simple and very effective for the purposes intended, with no great likelihood that anything will get out of order.

It should be understood that only an illustrative embodiment of this invention has been disclosed and that the same may assume other forms in practice without departing from the spirit and scope of this invention as indicated in the following claims.

What is claimed is:

1. In combination, a support, a mower including a frame pivotally connected to the support, said mower including a driving mechanism, means for automatically causing angular displacement of the mower and frame with respect to the support when an obstruction is encountered, and disconnectible means for stopping the driving mechanism as the mower is displaced.

2. The combination with a tractor having a draw element, of a mower having a frame connected to said element to be angularly displaceable with respect thereto, and means for displacing said frame when the mower strikes an obstruction.

3. The combination with a tractor having a draw-element, of a mower having a frame, means for connecting said frame to the element in a manner to be angularly displaceable with respect thereto, and means for causing said frame to be so displaced in a horizontal plane.

4. The combination with a tractor having a draw-bar, of a frame carried by the bar, a cutter bar connected to and extending laterally from the frame, and a coupling arm connecting the cutter bar and frame.

5. The combination with a tractor having a draw-bar, of a mower frame pivotally supported by the drawbar, a cutter bar pivoted to the frame, and a coupling arm connecting the cutter bar and frame.

6. The combination with a tractor having a draw-bar, of a mower frame pivotally supported by the draw bar, a cutter bar connected to the frame, and means engaging the drawbar for normally retaining the frame against pivotal movement to hold the cutter bar in a laterally extending position with respect to the tractor.

7. The combination with a tractor having a draw bar, of a mower frame pivotally connected to the drawbar, a cutter bar connected to the frame, and a latch engaging the drawbar for releasably retaining the frame against pivotal movement to hold the cutter bar in a position extending laterally of the tractor.

8. The combination with a tractor having a drawbar, of a mower including a frame pivotally connected to the drawbar at one point, means releasably securing the frame to the draw bar at another point, and means for releasing the frame to swing rearwardly when the mower strikes an obstruction.

9. The combination with a tractor having a drawbar, of a mower including a frame pivotally connected to the drawbar at one point, means detachably securing the frame to the draw bar at another point, a rock shaft carried on the frame, and means for operating said shaft to release the detachable means when the mower strikes an obstruction to cause the frame to swing rearwardly.

10. The combination with a tractor having a drawbar, of a mower including a frame pivotally mounted on the draw-bar, means for locking the frame to the draw bar to hold the mower laterally in cutting position, and pull means controlled by the mower when it strikes an obstruction for releasing the locking means, whereby the mower and frame may swing rearwardly of the tractor.

11. The combination with a tractor having a draw bar, of a mower including a frame pivoted on the draw bar, a cutter bar extending laterally of the frame, a latch for securing the frame to the draw bar to hold the cutter bar laterally in cutting position, a rockshaft for controlling the latch, and a coupling arm connected to the cutter bar and rock shaft, whereby when the cutter bar strikes on obstruction the shaft will be rocked to release the frame from the draw bar to cause it to swing with the cutter bar rearwardly of the tractor.

12. The combination with a tractor having a draw bar, of a mower including a frame pivoted on the draw bar, a cutter bar extending laterally of the frame, a spring pressed latch for locking the frame to the draw bar to hold the cutter bar laterally in its cutting position, and means connecting the latch to the cutter bar, whereby when the cutter bar is subjected to a predetermined force the latch will be released from the draft bar to cause the frame to swing with the cutter bar rearwardly of the tractor.

13. The combination with a tractor having a draw bar, of a mower including a frame pivotally mounted on the draw bar and a cutting mechanism extending laterally of the frame and tractor, driving means for the cutting mechanism, means for causing said mower to swing back when the same strikes an obstruction, and means for stopping the driving mechanism when the mower swings back.

14. The combination with a tractor having a draw element, of a frame pivoted to the draw element, a cutter bar including a cutting mechanism connected to the frame and extending laterally thereof, a driving connection from the tractor for operating said cutting mechanism, means for causing the frame to swing rearwardly with respect to the draw element when the cutter bar strikes an obstruction, and means whereby the cutting mechanism is stopped when the frame swings rearwardly a predetermined distance.

15. The combination with a tractor having a power take-off shaft and a draw bar, of a frame pivoted to the draw bar, a cutter bar including cutting mechanism connected to and extending laterally of the frame, driving means for the cutting mechanism carried on the frame embodying a splined connection to said take-off, and means for causing the frame to swing backwardly of the draw bar when the cutter bar strikes an obstruction, said splined connection being disconnected from the take-off shaft when the frame has swung back a predetermined distance to stop the cutting mechanism.

16. The combination with a tractor having a draw bar, of a mower including a frame pivotally connected at one point to the draw bar and at another point releasably connected to the draw bar, means for releasing said frame when the mower strikes an obstruction whereby it may swing back to the rear of the tractor, and means for automatically connecting the frame to the draw bar again by backing the tractor.

17. The combination of a tractor and a mower pivotally connected at one point and releasably connected at another point to the tractor, means for disconnecting the releasable connection of the mower automatically from the tractor when it strikes an obstruction so that the mower may pivot back to the rear of the tractor, and means for automatically connecting the mower to the tractor again by backing the tractor.

18. The combination with a tractor having a drawbar at its rear, of a mower including a frame pivotally connected to said drawbar, a coupling bar rockably mounted on the frame, a coupling yoke rockably mounted on the coupling bar, a cutter bar pivoted to the yoke, means releasably connecting one end of the mower frame to the drawbar remote from its pivotal connection to said drawbar, and means connected to the yoke for transmitting a force to cause release of said releasable means when the cutter bar encounters an obstruction to cause the mower frame and cutter bar to pivot back rearwardly.

19. The combination with a tractor having a drawbar at its rear, of a mower including a frame pivotally connected at one point to the drawbar and releasably connected to the drawbar at another point, a coupling yoke for the mower, means for releasing the releasable connection, and means connected to said coupling yoke for operating the releasing means when the mower strikes an obstruction to cause the mower frame to pivot back rearwardly.

20. The combination with a tractor having a drawbar at its rear end, of a mower including a frame having a lateral part and a longitudinal part, said frame being pivotally connected at one point to the drawbar and releasably connected to the drawbar at another point, a coupling yoke for the mower, and releasing means for the releasable connection of the frame, said releasing means carried by the longitudinal part of the frame and connected to the mower coupling yoke.

21. The combination with a tractor having a drawbar at its rear, of a mower having a frame pivotally connected at one part and releasably connected at another part to the drawbar, a cutting mechanism for the mower, means on the frame adapted to be driven from the tractor for driving the cutting mechanism, pull means controlled by the mower when it strikes an obstruction for causing release of the releasable connection to cause the frame to swing back rearwardly on its pivot, and extensible connections between the tractor and driven means on the frame whereby said driven means may swing with the frame.

22. The combination with a tractor having driving mechanism and a support, of a mower including a frame pivotally mounted on the support, a cutter bar and cutting mechanism extending in normal cutting position laterally of the frame, a releasable connection for holding the frame to keep the cutter bar and mechanism in such position, gearing on the frame for operating the cutting mechanism, said gearing adapted to be driven from the tractor driving mechanism, levers on the frame for adjusting the cutter bar, and pull means operable when the cutter bar strikes an obstruction to cause disconnection of the releasable connection to cause the frame and entire mower structure including gearing, levers and cutter bar to swing back rearwardly on the support.

23. A mower attachment for a tractor, said attachment comprising a support connectible with the tractor, a mower frame pivotally connected to the support, a releasable connection for the frame normally to prevent pivotal movement thereof, a cutter bar and cutting mechanism connected to the frame, driving and adjusting mechanism for the mower located on the frame, and pull means effective when the cutter bar strikes an obstruction to cause release of the releasable connection to cause the entire mower structure to pivot back rearwardly on the support.

24. The combination with a tractor having a drawbar at its rear, of a frame hingedly connected to the drawbar at one point and releasably connected to the drawbar at another point, a rearwardly and laterally extending coupling bar pivotally supported on the frame for vertical swinging movement, a coupling yoke rockably carried by said bar, a cutter bar connected to the yoke, and pull means for transmitting force when the bar encounters an obstruction to effect release of the frame to cause the same with the coupling bar, yoke and cutter bar to swing rearwardly.

25. The combination with a tractor having a drawbar, of a mower frame hingedly carried on the drawbar, a yieldable latch for releasably connecting the frame to the drawbar, a coupling bar carried by the frame, a yoke carried by the bar, a cutter bar connected to the yoke, and a rod for transmitting force exerted by the cutter bar when it encounters an obstruction to cause the latch to be released to free the frame and mover structure for hinging movement.

26. The combination with a support, of a frame hingedly connected thereto for swinging movement in a horizontal plane, a releasable latch for normally connecting the frame to the support to prevent such swinging movement, a cutter bar, and means for connecting the cutter bar to the frame to swing therewith, said latch being releasable when the bar encounters an obstruction to cause hinging movement of the frame and mower structure relative to the support.

27. In combination, a tractor provided with a support, a mower frame pivotally connected to the support and normally extending transversely relative thereto, a cutter bar including a sickle connected to the frame and normally extending transversely as a continuation of the frame, a pitman driven from the tractor for operating the sickle, and a releasable connection whereby the frame, pitman and cutter bar may swing from the normal transverse position to a position rearwardly of the tractor when the cutter bar encounters an obstruction.

28. In combination, a tractor provided with a support, a mower including a frame, pitman and cutter bar structure comprising a mower unit pivotally connected to the support and normally held extended in a transverse direction with respect to the support, and means whereby the mower unit may be released when an obstruction is encountered to free the same for movement about its pivotal connection to a position rearwardly of the tractor and support.

In testimony whereof I affix my signature.

CHARLES PEARSON.